US006912909B1

(12) United States Patent
Meacham et al.

(10) Patent No.: US 6,912,909 B1
(45) Date of Patent: Jul. 5, 2005

(54) DIAPHRAGM-TYPE PRESSURE SENSORS FOR SLURRIES AND SIMILAR FLOWS

(75) Inventors: Allan J. Meacham, Portland, OR (US); Peter C Wilson, Washougal, WA (US)

(73) Assignee: APPCOR at Prindle Station, Washougal, WA (US)

( * ) Notice: Subject to any disclaimer, the term of this patent is extended or adjusted under 35 U.S.C. 154(b) by 0 days.

(21) Appl. No.: 10/897,301

(22) Filed: Jul. 22, 2004

(51) Int. Cl.[7] .............................................. G01L 7/08
(52) U.S. Cl. ...................................................... 73/715
(58) Field of Search .......................... 73/714, 715–727, 73/756, 53.05–53.07; 175/24–27

(56) References Cited

U.S. PATENT DOCUMENTS

| 3,718,046 | A | 2/1973 | McJones |
| 3,958,716 | A | 5/1976 | Korte |
| 5,295,400 | A | 3/1994 | Tatani et al. |
| 5,652,391 | A | 7/1997 | Kingsford et al. |
| D416,822 | S | 11/1999 | Slate et al. |
| 6,085,597 | A | 7/2000 | Miller et al. |
| 6,315,062 | B1 * | 11/2001 | Alft et al. ..................... 175/45 |
| 6,719,069 | B2 * | 4/2004 | Alft et al. ..................... 175/24 |

FOREIGN PATENT DOCUMENTS

| JP | 07253478 A2 | 3/1995 |
| RU | 2 132 543 C1 | 6/1999 |

OTHER PUBLICATIONS

Gauge Guards, pp. 205-207, ALSCO Industrial Products, Inc., Lithia Springs, GA.
Gauge Guard, Bulletin S-875, (1 page), APPCOR At Prindle Station, Washougal, WA.
Gauge Protector, A Furon Product, 1996, (4 pages), Boiswood, Gloucester.
Gauge Protectors—B-8498 Series, [online], [retrieved on Aug. 18, 2003] Retrieved from C & G Industrial Supply, Inc. using Internet <URL: http://www.cgindustrial.com/b8498.htm>.
Gauge Protectors—Type 12000 and B-8498, [online], [retrieved on Aug. 18, 2003] Retrieved from C & G Industrial Supply, Inc. using Internet <URL: http://www.cgindustrial.com/type12000.htm.
Gauge Isolators, [online], [retrieved on Aug. 19, 2003] Retrieved from Chemline using Internet <URL:http://www.chemline.com/gaugeiso.htm>.
Pressure Gauge Protectors, BEC Engineering Product Specification Release (1 page).
Noshok Diaphragm Seal & Gauge Accessories, p. 866, John Henry Foster Co., U.S.A.
ITT Conoflow diaphragm seals, [online], [retrieved on Aug. 19, 2003] Retrieved from H J Kirby Corp. using Internet <URL: http://www.hjkirbycorp.com/Conoflow.htm>.

(Continued)

Primary Examiner—William Oen
(74) Attorney, Agent, or Firm—W. Scott Carson

(57) ABSTRACT

A diaphragm-type sensor arrangement to measure the flow pressure in a main pipe. The arrangement includes a connecting line in fluid communication with the main line and a housing with a chamber. The chamber is isolated from fluid communication with the connecting line by a flexible diaphragm and filled with a second fluid. In use, the diaphragm is displaced by pressure changes in the connecting line which in turn displaces the second fluid in the housing chamber to activate a pressure reading device. The sensor arrangement is particularly adapted for use with slurry flows of particulate solids in a liquid carrier and further includes a reaming member to breakup any consolidated plugs or clogs of solid particles in the connecting line.

20 Claims, 5 Drawing Sheets

OTHER PUBLICATIONS

OPW Instrumentation Isolation Ring, [online], [retrieved on Aug. 18, 2003] Retrieved from OPW Engineered Systems using Internet <URL: http://www.opw-es.com/menu4.htm>.

True Blue Ultra-Pure Gauge Guards, [online], [retrieved on Aug. 12, 2003] Retrieved from Plast-O-Matic Valves, Inc. using Internet <URL: http://www.connectworld.net/plast/ggmu.html>.

Quality Engineered Thermoplastic Valves & Controls for corrosive and ultra-pure liquids, Apr. 1999, 4(pages), Digest Catalog 21, Plast-O-Matic Valves, Inc., Cedar Grove, NJ.

Miniature Thermoplastic Diaphragm Seals/Gauge Guards, Plast-O-Matic Product Data, Jul. 1995, (2 pages), Catalog GGME, Plast-O-Matic Valves, Inc., Cedar Grove, NJ.

Chemical Gauge Guards, An Economical Way to Protect Instruments From Corrosion and Clogging . . . , Plast-O-Matic Product Data, Jun. 2000, pp. 1-4, Catalog GGM-6, Plast-O-Matic Valves, Inc., Cedar Grove, NJ.

Pressure Gauge Information & Selection, [online], [retrieved on Aug. 19, 2003] Retrieved from Rototherm instrumentation and control using Internet <URL: http://www.rototherm.co.uk/gaugeinfo.htm>.

RyanHerco Fluid Flow Solutions. Protect Your Pressure or Vacuum Instruments From Clogging, Corrosion & Damage, News From The Poly Pro's, Aug. 13, 2003 [online], [retrieved on Aug. 13, 2003]. Retrieved from the Internet <URL: http://www.newsfromthepolypros.com/applications/plastomatic2002a.htm>.

Gauge Guards, p. 80, Spears.

Diaphragm pressure gauge guard MDM 901, Dec. 2000, Print No. 330 070, ASV Stubbe Italia srl, Milano.

Teflon Body Guage Isolator 2003, [online], [retrieved on Aug. 19, 2003] Retrieved from Teqcom Industries, Inc. using Internet <URL: http://www.thomasregister.com/olc/teqcom/te14/htm>.

GP140 Metallic Diaphragm Series (Process Pressure Gauge Chemical Seals/Isolators) 1997-2001, [online], [retrieved on Aug. 18, 2003] Retrieved from 3D Instruments, LLC using Internet <URL: http://www.3dinstruments.com/seal.htm>.

GP400 Gauge Isolator, [online], [retrieved on Aug 19, 2003] Retrieved from 3D Instruments, LLC using Internet <URL: http://www.3dinstruments.com/gp400.htm>.

PVC Gauge Guards, [online], [retrieved on Aug. 12, 2003] Retrieved from Valler Industries using Internet <URL: http://www.valler.com/fish/gauge-guards.html>.

* cited by examiner

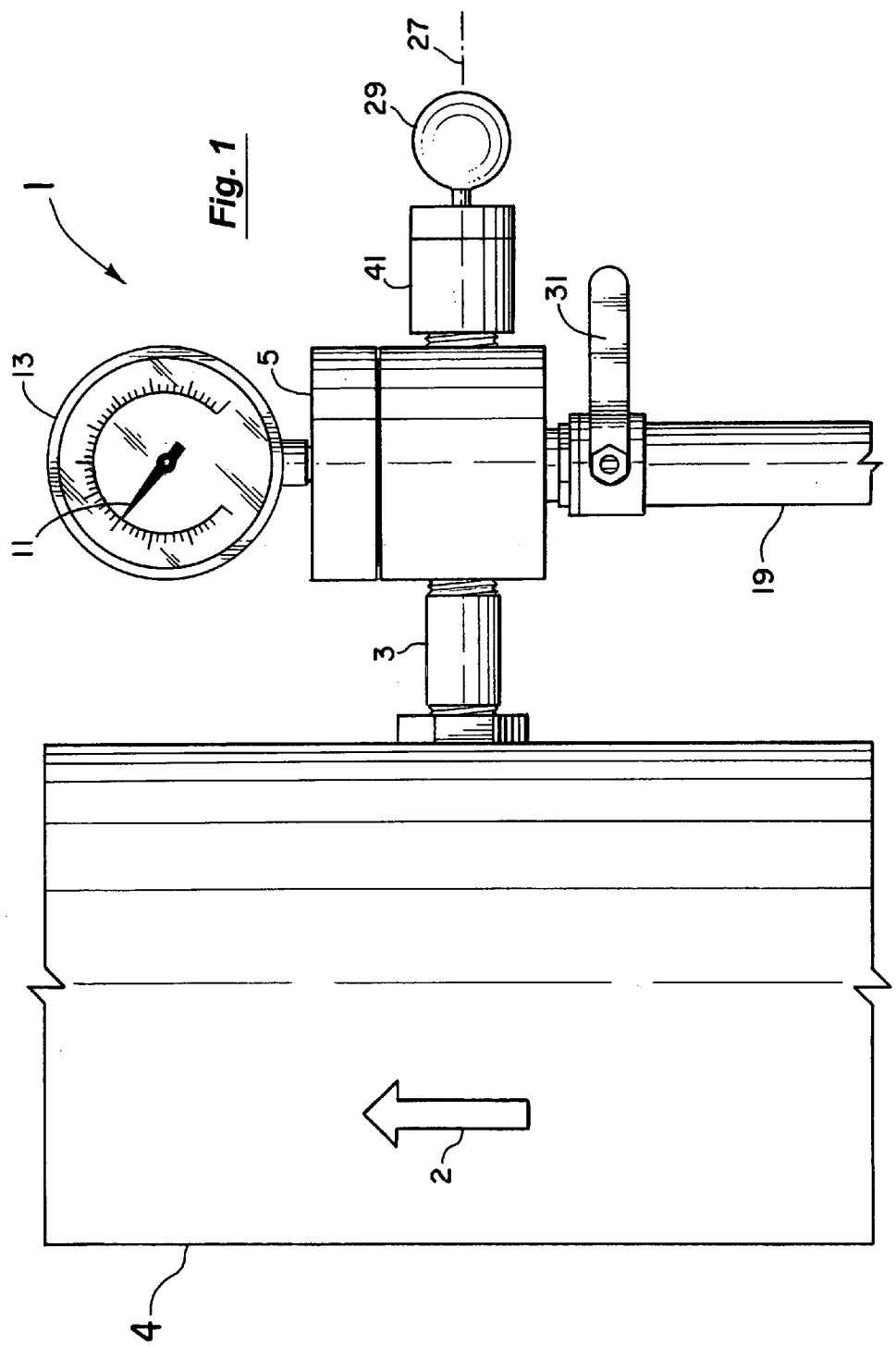

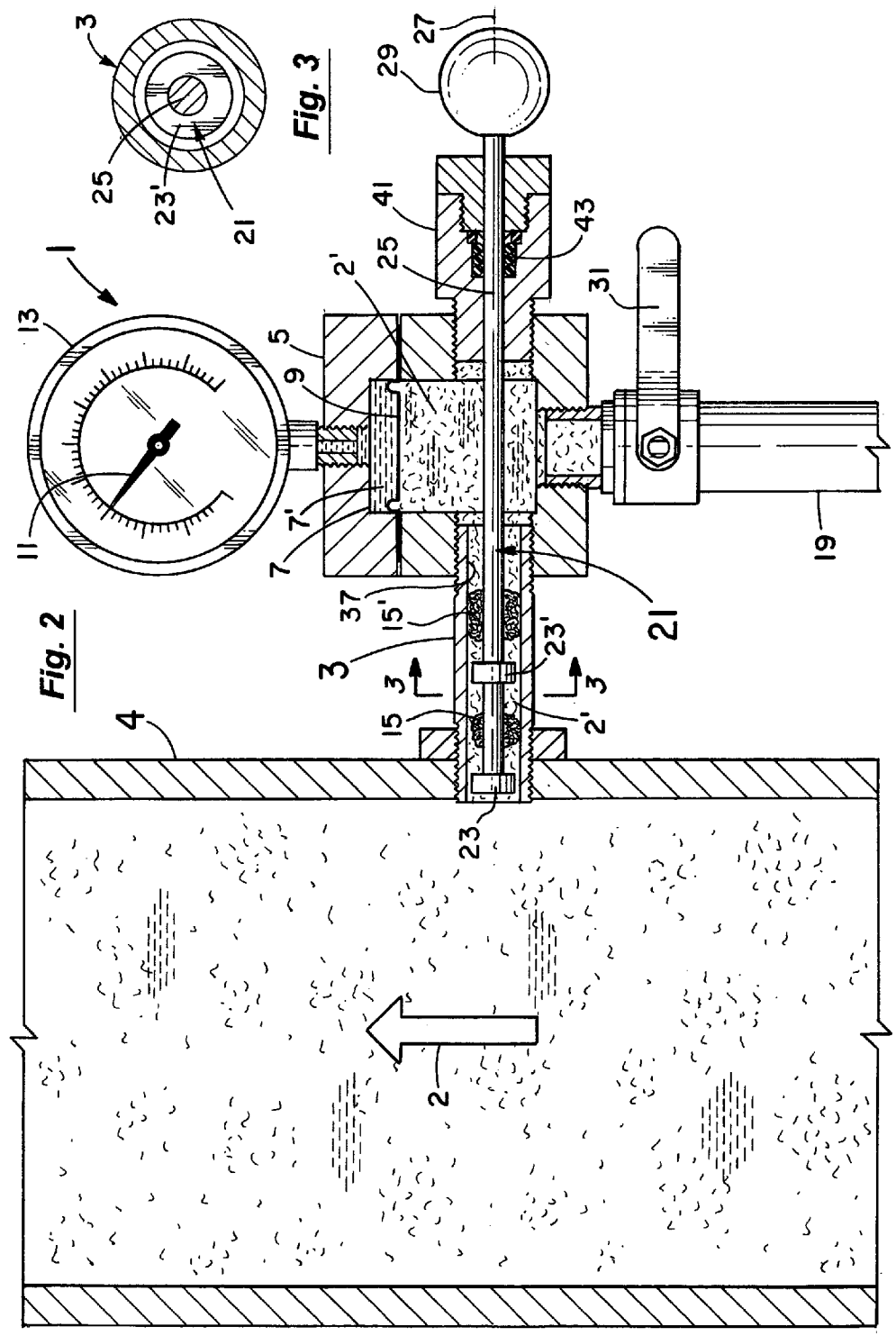

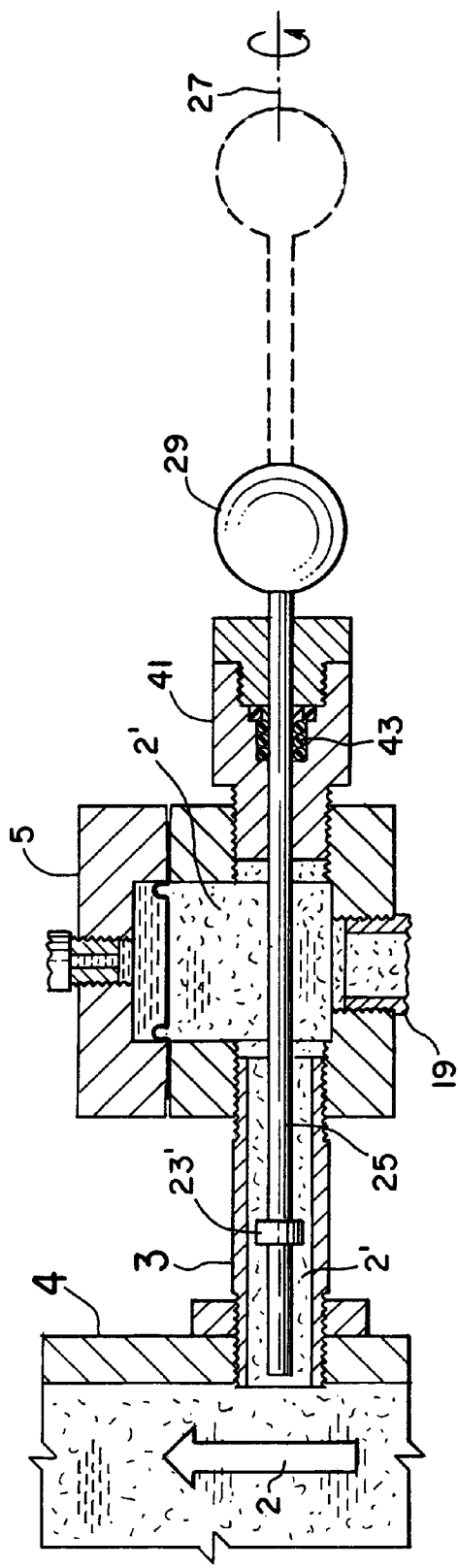
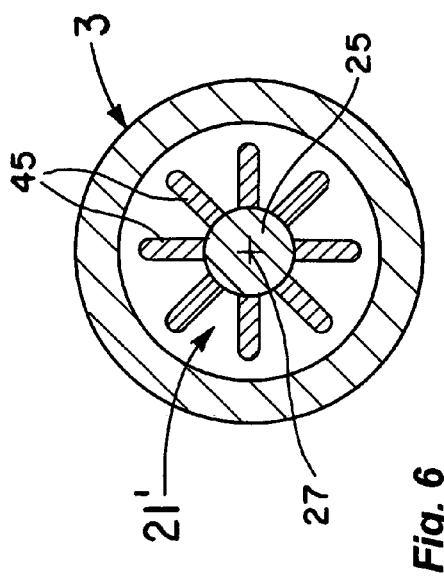
Fig. 5
Fig. 6

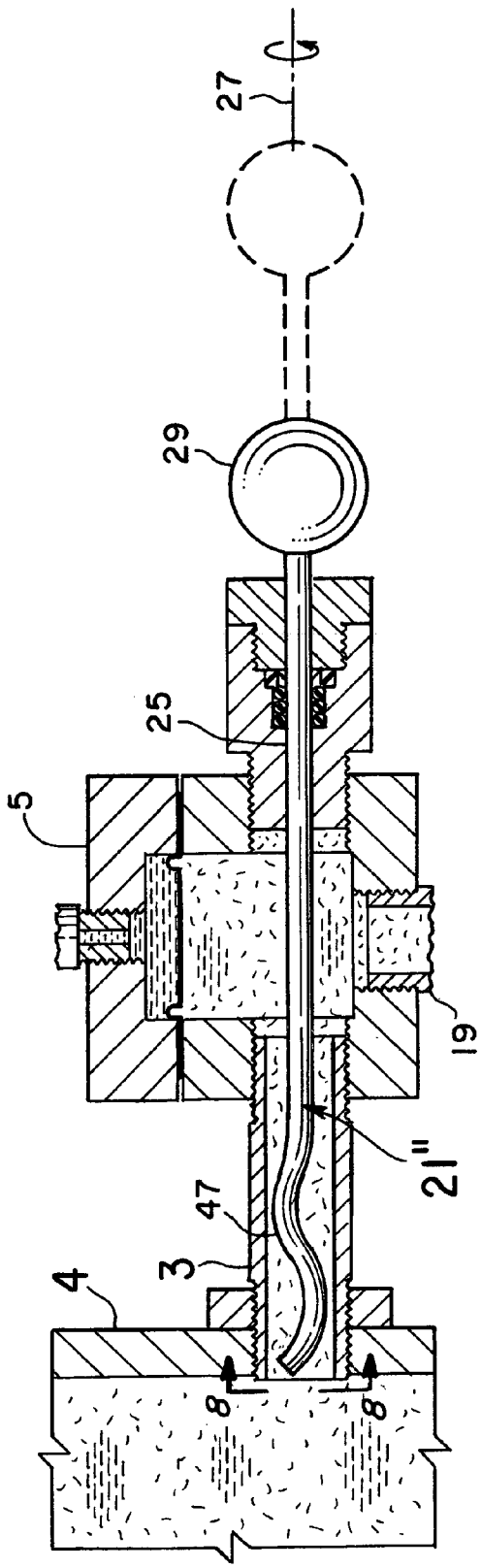
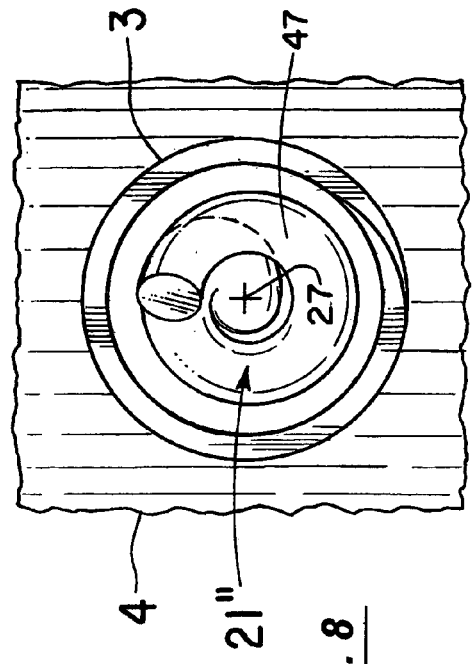
Fig. 7
Fig. 8

DIAPHRAGM-TYPE PRESSURE SENSORS FOR SLURRIES AND SIMILAR FLOWS

BACKGROUND OF THE INVENTION

1. Field of the Invention

This invention relates to the field of pressure sensors and more particularly to the field of diaphragm-type sensor arrangements for measuring the pressure in slurries and similar flows.

2. Discussion of the Background

Diaphragm-type sensor arrangements are widely used to measure the pressure in fluids flowing through pipes. In a typical arrangement, the pressure sensor is mounted on the main pipe by a stub or connecting line. The pressure of the flow in the main pipe is then transmitted by the connecting line to the sensor where the reading is either viewed directly or sent to a remote, monitoring location.

Commercially available systems normally include a housing with a guard for the sensor wherein the housing includes a chamber isolated from the fluid in the connecting line by a diaphragm or similar member. The chamber typically includes a second fluid such as glycol or mineral oil. As the diaphragm is displaced due to pressure changes in the connecting line, the change is transmitted to the sensor by the second fluid. Such isolation of the sensor from the fluid of the main pipe is particularly desirable if the flow in the main pipe has corrosive or sticky components or if the flow is a slurry of solids suspended in a liquid carrier.

Slurries in particular can present special operating problems. Chief among them is that the solid particles tend to settle out or consolidate in the connecting line and plug it up. As a result, the pressure of the flow in the main line can be incorrectly transferred to the sensor or not transferred to the sensor at all.

In such slurries that tend to plug or clog the connecting line, a purge line is often provided. The purge line is placed in fluid communication with the connecting line and is typically valved. In operation, the valve of the purge line is opened periodically or just before reading the sensor in an effort to flush out any plug or clog in the connecting line. However, this is not always successful in removing the plug or clog as the pressure differential between the flow of the main pipe and the outlet of the purge line may not be sufficient to dislodge and flush the plug or clog from the connecting line.

With this and other problems in mind, the present invention was developed. In it, a diaphragm-type sensor arrangement is provided which includes a reaming member. The reaming member is movable to mechanically clean out the connecting line to breakup or dislodge any partial or complete plugs or clogs. The gauge of the sensor arrangement can then be relied upon to accurately read the flow pressure in the main pipe.

SUMMARY OF THE INVENTION

This invention involves a diaphragm-type sensor arrangement for measuring the pressure of the flow in a main pipe. The sensor arrangement includes a connecting line in fluid communication with the flow of the main line and a housing with a chamber isolated from fluid communication with the connecting line by a flexible diaphragm. The chamber is filled with a second fluid wherein the diaphragm is displaced by pressure changes in the connecting line. The displacement of the diaphragm then displaces the second fluid in the housing chamber to move or otherwise activate a gauge or other pressure reading device.

The sensor arrangement of the present invention is particularly adapted for use with slurry flows of particulate solids in a liquid carrier. In such flows, the solid particles tend to settle out and form plugs in the connecting line leading to inaccurate readings by the gauge. In this regard, the sensor arrangement of the present invention further includes a reaming member. The reaming member is mounted for movement within the connecting line to breakup any consolidated plugs or clogs of solid particles in the connecting line. The gauge can then truly and accurately read the flow pressure in the main pipe.

BRIEF DESCRIPTION OF THE DRAWINGS

FIG. 1 illustrates the senor arrangement of the present invention mounted on a main pipe to measure the pressure of the flow in it.

FIG. 2 is view similar to FIG. 1 with some of the components of the sensor arrangement shown in cross section.

FIG. 3 is a view taken along line 3—3 of FIG. 2.

FIG. 5 illustrates a second embodiment of the reaming member.

FIG. 6 is a cross-sectional view of another modification of the reaming member.

FIG. 7 shows an embodiment of the present invention in which a portion of the reaming member is helical.

FIG. 8 is a view taken along line 8—8 of FIG. 7.

DETAILED DESCRIPTION OF THE INVENTION

Figure 4:
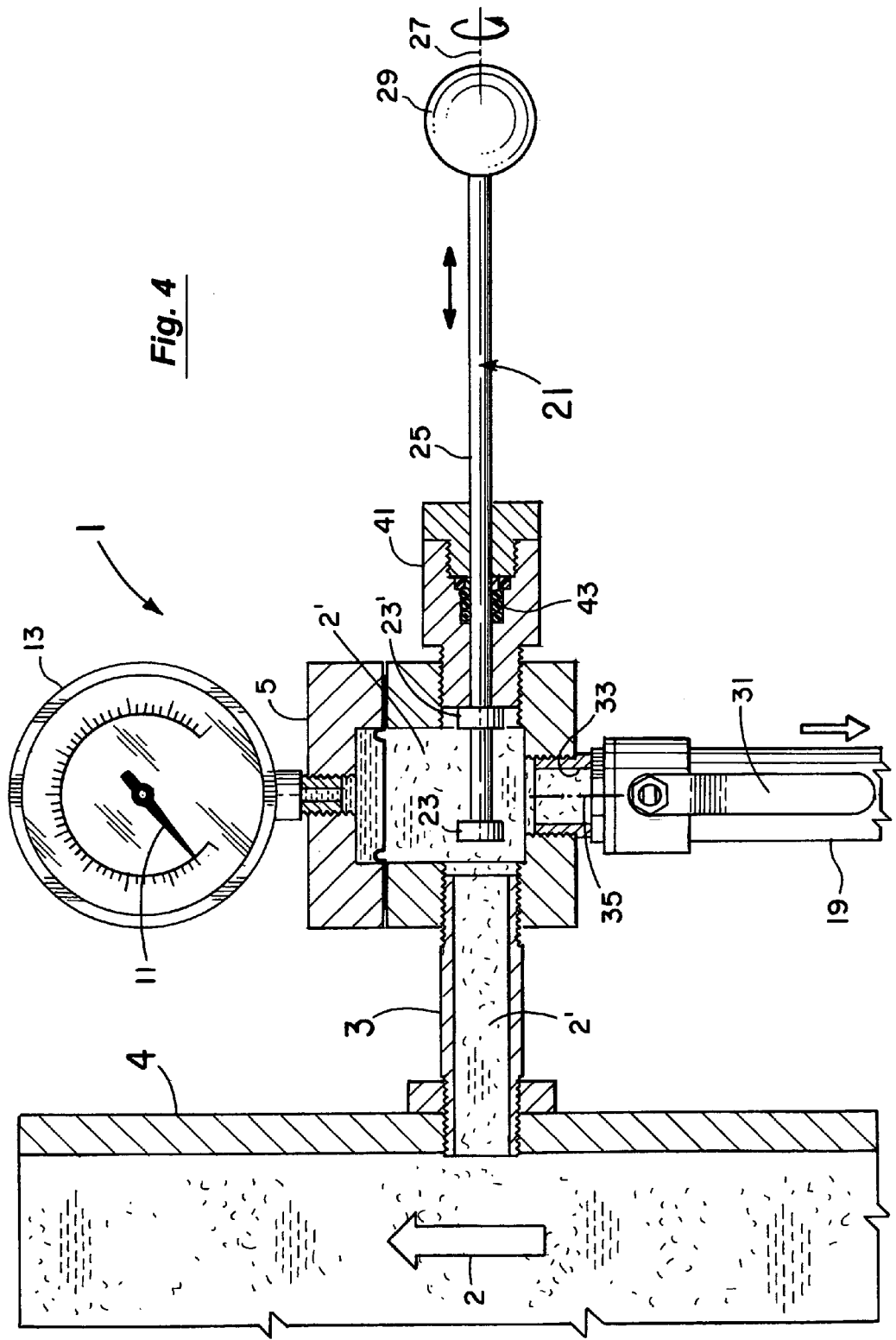
FIG. 4 is a view similar to FIG. 2 with the reaming member of the present invention shown in its retracted position.

As shown in FIGS. 1 and 2, the present invention involves a diaphragm-type sensor arrangement 1 for measuring the pressure in the flow 2 in the main pipe 4. The sensor arrangement 1 includes a stub or connecting line 3 in fluid communication (see FIG. 2) with the flow 2 in the main pipe 4. The sensor arrangement 1 additionally includes a housing 5 with a chamber 7 (FIG. 2) isolated from fluid communication with the connecting line 3 by a flexible diaphragm 9. The chamber 7 is filled with a second fluid 7' (e.g., glycol or mineral oil) and the diaphragm 9 is displaced relative to the chamber 7 in response to pressure changes in the connecting line 3. The displacement of the diaphragm in turn displaces the fluid 7' in the chamber 7 to move the indicator 11 of the gauge 13.

In operation and particularly when the flow 2 in the main pipe 4 is a slurry of solid particles (e.g., coal, fibers such as paper pulp, or magnetite) suspended in a liquid carrier such as water, a plugging problem can develop. That is, the particulate solids in the relatively stagnant slurry portion 2' in the connecting line 3 tend to settle out or consolidate and form plugs. Such plugs can partially as at 15 in FIG. 2 or completely as at 15' clog the connecting line 3. In extreme cases, the entire slurry portion 2' in the connecting line 3 extending to the purge line 19 may completely plug up. The result is that the pressure of the flow 2 in the main line 4 can be incorrectly transmitted to the gauge 13 or not transmitted to the gauge 13 at all. In the illustrated case of FIG. 2, the gauge 13 is shown actually reading a pressure but it is only a reading of the pressure to the right of the complete plug 15' and not the true pressure of the flow 2 in the main pipe 4.

To overcome such partial and complete plugging problems, the sensor arrangement 1 of the present invention has been provided with a reaming arrangement. As best seen in FIGS. 2 and 3, the reaming arrangement includes a reaming member 21 mounted to extend within and along the connecting line 3. The reaming member 21 as shown in FIG. 2 can include one or more disc portions 23 and 23' (see also FIG. 3) mounted on the shaft 25. The disc portions 23, 23' and shaft 25 can then be reciprocally moved along the axis 27 (see FIGS. 2 and 4) to dislodge or breakup any consolidated-plugs of particulate solids in the slurry portion 2'. The disc portions 23, 23' and shaft 25 can also be rotated about the axis 27 if desired. Such reciprocal and/or rotational movement can be accomplished manually by manipulating the handle 29 or automatically if preferred. Additionally, if desired, the valve mechanism 31 of the purge line 19 can be opened (FIG. 4) at the same time to flush out the connecting line 3.

When the purge line 19 is used, the disc portion 23' is preferably fully retractable as in FIG. 4 to one side of the inner surface 33 of the purge line 19. Also, the disc portions 23 and 23' in this regard are preferably spaced apart along the shaft axis 27 a distance at least as great as or greater than the distance the inner surface 33 of the purge line 19 is spaced about the axis 35. In the illustrated embodiment of FIG. 4 in which the axis 35 of the purge line 19 is substantially perpendicular to the axis 27 of the shaft 25, the disc portions 23 and 23' then substantially straddle the sides of the inner surface 33 of the purge line 19.

In the preferred embodiment, the purge line 19 is present but it could be eliminated or not used if desired. The reaming member 21 would then be relied upon by itself to breakup or dislodge any plugging. In this regard, the disc portions 23, 23' may breakup any plugging not only by physically contacting plugs such as 15 and 15' in FIG. 2 but also by the turbulence and pumping action created by reciprocating and/or rotating the reaming member 21 in the slurry portion 2'.

The axes 27 of the shaft 25 and connecting line 3 are preferably aligned and collinear as in FIG. 2. The disc portions 23, 23' then preferably extend outwardly of the shaft axis 27 (FIG. 2) for a distance less than the inner surface 37 of the connecting line 3 is spaced from the collinear axis 27. In the illustrated embodiment, the disc portions 23, 23' aid in keeping the reaming member 21 centrally aligned in the connecting line 3. However, the disc portions 23, 23' need not extend outwardly of the shaft axis 27 as far as shown to still be effective. There could also be just one disc portion such as 23' in FIG. 5 or the disc portions 23, 23' could be eliminated leaving only the shaft 25. Preferably, there is an outwardly protruding portion or portions such as 23, 23' on the shaft 25. Also, the shaft 25 as indicated above is preferably supported in guide 41 and seal or packing 43 (see FIGS. 4 and 5) not only for reciprocal movement along the axis 27 but also for rotational movement about the axis 27.

The protruding portion or portions such as 23, 23' extending about and outwardly of the shaft 25 and axis 27 can be any number of shapes including the illustrated discs of FIGS. 1–5 and the plurality of spoke members 45 of the reaming member 21' of FIG. 6. With such spoke members 45 spaced from each other about the shaft axis 27, certain clogs or plugs may be more easily broken up as the spoke members 45 are reciprocated along the axis 27 and/or rotated about the axis 27. The working portion 47 of the reaming member 21" as in FIGS. 7 and 8 could also be substantially helical (e.g., coil, spiral) with the helical portion 47 extending substantially along and about the axis 27.

It is noted that the illustrated pressure reading or responsive device is a gauge 13 with a dial or indicator 11. However, other devices could be used such as transducers or switches. The devices could also be ones intended to be read on site such as the gauge 13 and/or at remote, monitoring stations. The measured pressure of the flow 2 in the main pipe 4 could also be above or below ambient depending upon whether the flow 2 is being positively pumped or negatively drawn through the main pipe 4.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. In a diaphragm-type sensor arrangement to measure pressure in a slurry of solid particles suspended in a liquid in a main pipe, said sensor arrangement having at least one connecting line in fluid communication with the slurry in the main pipe, said sensor further including a housing having a chamber isolated from fluid communication with the connecting line by a flexible diaphragm, said chamber being filled with a fluid and said diaphragm being displaced relative to said chamber in response to pressure changes in said connecting line, said sensor arrangement having a pressure reading device isolated from fluid communication with the connecting line and responsive to pressure changes in the fluid in said chamber, the improvement including:

a reaming arrangement including a reaming member mounted to extend within and along said connecting line, said reaming member further being movable relative to said connection line to breakup any consolidated plugs of said solid particles clogging said connecting line.

2. The sensor arrangement of claim 1 wherein said connecting line extends substantially along a first axis and said reaming member is mounted to extend along a second axis substantially aligned with said first axis.

3. The sensor arrangement of claim 2 wherein said first and second axes are substantially collinear.

4. The sensor arrangement of claim 2 wherein said reaming member is mounted for reciprocal movement along said second axis relative to said connecting line.

5. The sensor arrangement of claim 4 wherein said reaming member is further mounted for rotational movement about said second axis relative to said connecting line.

6. The sensor arrangement of claim 2 wherein said reaming member is mounted for rotational movement about said second axis relative to said connecting line.

7. The sensor arrangement of claim 2 wherein said connecting line has an inner surface extending along and about said first axis and being spaced a first distance from said first axis, said reaming member having a portion extending about said second axis and being spaced from said second axis a distance less than said first distance.

8. The sensor arrangement of claim 7 wherein said portion of said reaming member is mounted on a shaft extending along said second axis.

9. The sensor arrangement of claim 8 wherein said reaming member further includes a second portion mounted on said shaft and spaced from said first portion, said second portion being spaced from said second axis a distance less than said first distance said inner surface of said connecting line is spaced form said first axis.

10. The sensor arrangement of claim 9 further including a purge line in fluid communication with said connecting line and a valve mechanism to selectively open and close said purge line, said purge line extending substantially along a third axis substantially perpendicular to said first axis, said purge line having an inner surface extending along and about the third axis and being spaced a third distance from said third axis, said first and second portions of said reaming member being spaced from each other along said second axis a distance at least as great as said third distance, said reaming member being reciprocally movable along said second axis relative to said connecting line between at least a first position with said first and second portions in said connecting line and a second position with said first and second portions substantially straddling said purge line on either side of the inner surface of said purge line.

11. The sensor arrangement of claim 2 wherein said reaming member has a plurality of spoke members extending outwardly of said second axis.

12. The sensor arrangement of claim 11 wherein said spoke members are spaced from each other about said second axis.

13. The sensor arrangement of claim 2 wherein said reaming member has a substantially helical portion.

14. The sensor arrangement of claim 13 wherein said helical portion extends about and along said second axis.

15. The sensor arrangement of claim 13 wherein said helical portion of said reaming member is mounted for rotational movement about said second axis relative to said connecting line.

16. The sensor arrangement of claim 13 wherein said helical portion of said reaming member is mounted for reciprocal movement along said second axis relative to said connecting line.

17. The sensor arrangement of claim 2 further including a purge line in fluid communication with said connecting line and a valve mechanism to selectively open and close said purge line.

18. The sensor arrangement of claim 1 further including a purge line in fluid communication with said connecting line and a valve mechanism to selectively open and close said purge line.

19. The sensor arrangement of claim 1 wherein said solid particles are selected from the group of coal, fibers, and magnetite.

20. The sensor arrangement of claim 1 wherein said pressure reading device is a gauge.

* * * * *